United States Patent [19]
Ermold et al.

[11] 3,739,066
[45] June 12, 1973

[54] ELECTRODE REMELTING ARRANGEMENT

[75] Inventors: Edgar Ermold, Bruchkobel; Hans F. W. Schwartz-Domke, Hanau; Helmut Scheidig; Karl-Georg Redel, Rodenbach, all of Germany

[73] Assignee: Leybold-Heraeus-Verwaltung GmbH, Cologne-Bayental, Germany

[22] Filed: Dec. 3, 1971

[21] Appl. No.: 204,540

[30] Foreign Application Priority Data
Mar. 9, 1971 Germany.................. P 21 11 047.4

[52] U.S. Cl. ............................................ 13/9, 13/14
[51] Int. Cl. ............................ H05b 3/60, H05b 7/10
[58] Field of Search ............................. 13/9, 14–17, 13/9 ES

[56] References Cited
UNITED STATES PATENTS
3,589,434    6/1971    Kleinhagauer ..................... 13/9 ES Primary Examiner—Roy N. Envall, Jr.
Attorney—Joseph F. Padlon

[57] ABSTRACT

An arrangement for remelting electrodes, in which a plurality of electrode carrying arms are distributed about the periphery of a chill mold. The electrode carrying arms are pivoted in a horizontal plane, with the radius from the pivoting center to the axis of the electrode carried by an arm, passing through the center of the chill mold. The electrode carrying arms are also pivotable so that the axes of the electrodes carried by the arms, lie on concentric circles within the chill mold.

6 Claims, 4 Drawing Figures

FIG. 3
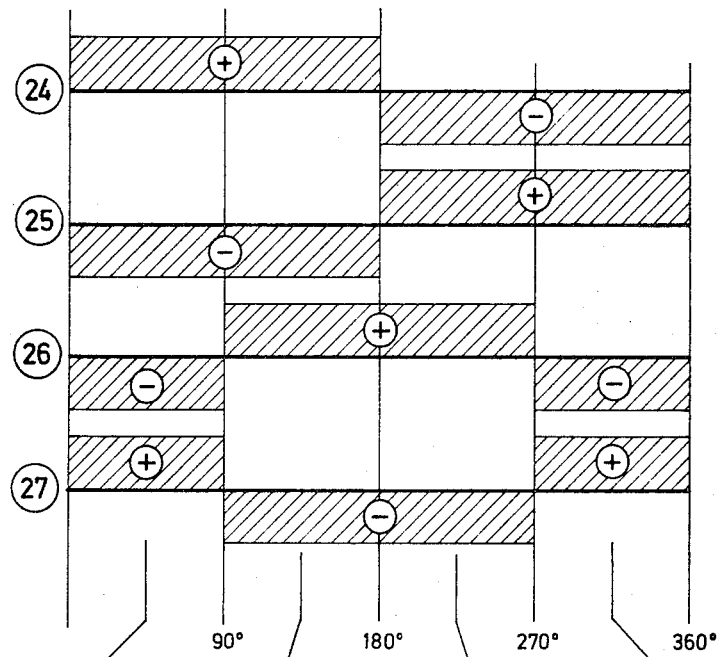
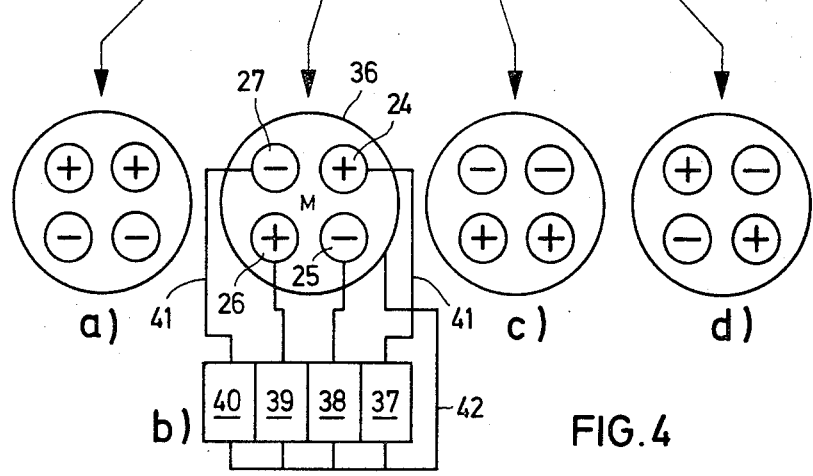
FIG. 4

ELECTRODE REMELTING ARRANGEMENT

BACKGROUND OF THE INVENTION

The present invention relates to an arrangement for melting electrodes in a manner whereby one or several electrodes are processed by one and the same chill mold. A plurality of electrode-carrying arms are distributed about the periphery of the chill mold, and are pivotable in a horizontal direction. The pivoting action of the electrode-carrying arms is such that the axes of the electrodes carried by the arms may all be positioned at the center of the chill mold.

An arrangement related to electrode melting, or such species, is disclosed in the German Pat. No. 1,813,478. In this arrangement, known in the art, two guide posts or columns are sidewise spaced from each other, and are fixed in place. Each of the guide posts is provided with an electrode carrying arm which is rotatable in horizontal direction, and is, at the same time, slidable in the vertical direction. The pivoting or rotating radius of the electrode carrying arms trace a path which has a common point of intersection with the other paths. This common point of intersection, moreover, coincides with the extended axis of the chill mold. The object of the conventional arrangement is to provide the chill mold alternatingly with an electrode to be melted, so that an ingot may be generated which is larger than the individual electrodes themselves.

SUMMARY OF THE INVENTION

It is an object of the present invention to improve upon the conventional arrangement for melting electrodes and converting the melted electrodes, so that either only one electrode or a plurality of electrodes can be selectively and simultaneously melted in one and the same chill mold.

It is also an object of the present invention to provide an improved arrangement, as set forth, which is simple in construction and may be readily fabricated.

It is a further object of the present invention to provide an arrangement of the foregoing character which is economically maintainable.

The present invention assumes that the user is acquainted with the art, and is capable of constructing a melting arrangement with a wide selection of blocks of different cross-sections, forms and weights. The need for high-priced metals as they are produced by such melting processes, is, on the one hand, not very great. Particularly small producers, on the other hand, do not have the possibility or capability of producing such quantities or to process the resulting block-shaped forms further. As a result, it is not profitable to provide a melting arrangement for installation for each size or magnitude of block of melted product. The manufacturer or producer of melted forms, is therefore interested in having an installation which may be used to produce more blocks as well as blocks of considerably larger dimensions. Thus, it is desirable to produce blocks having a diameter of 3 m and above.

When producing blocks of small diameters, only one electrode is usually melted at one time. For this reason it is desirable to process simultaneously a plurality of electrodes, for producing blocks of greater diameters. There are several reasons for this approach: it is, first of all, more economical to produce a larger quantity of small electrodes than a small number of larger electrodes. Small electrodes, furthermore, can also be used for producing blocks of substantially small diameters — a feature which is not possible with electrodes of larger diameters. Small electrodes, moreover, are easier to handle manually. By melting a plurality of electrodes, furthermore, within the same crucible, it is possible to achieve improved energy distribution and uniform bath depth, so that a homogeneous core structure is realized. Finally, the supply of energy for the melting process is also very significant under these conditions. The melting of a single thick electrode in place of a plurality of thinner electrodes, leads to unsymmetrical loading of the electrical supply lines, which, in turn, results in poor operating efficiency. By simultaneously applying a plurality of electrodes for the melting process, the required melting current may be simultaneously distributed over a plurality of phases of the current supply system. Aside from this, it is possible by applying a particular phase control, to either cause a rotational motion of the bath, or to function in the opposite manner, as well as to eliminate it altogether.

Applicable to this melting technique, are arrangements also for melting simultaneously two, three and more electrodes. The present invention has the object to provide a universal arrangement for the melting of electrodes in which the number of electrodes being melted is only limited by the number of electrode carrying arms used to melt such electrodes simultaneously, and to melt, thereby, blocks with different cross sections. The interchangeability of the chill molds for this purpose is, of course, prerequisite to applying this method.

The objects of the present invention are achieved by providing that the electrode carrying arms be positioned so that the axes of the electrodes carried by the arms are located along a circular path within the chill mold. The electrode carrying arms, furthermore, are positionable so that the axes of the electrodes intersect the center of the chill mold. Such a spatial arrangement can be achieved when, for example, four electrodes lie at the corners of a rhombus. In this case, each two electrodes lie upon a circle of different diameter. The present invention is also applicable to arrangements which deviate from the strict definition of concentricity with respect to the circular path assumed by the electrodes within the crucible.

The present invention may be installed in substantially all melting and converting furnaces as, for example, in electrical slag and arc furnaces. The present invention is also applicable to vacuum arc furnaces, when a plurality of vacuum chambers are provided for one chill mold, and these vacuum chambers are in the form of upper portions or elements provided with a different number of electrodes passing therethrough. In order to maintain the air free of pollution, consideration is also given to using separate suction or exhaust hoods for the open electrical slag and arc furnaces used to perform the melting and conversion of shapes of the product. The number of suction hoods used for this purpose, corresponds to the number of electrodes to be melted and converted in shape, and to the corresponding number of openings.

In accordance with the arrangement of the present invention, furthermore, it is possible to operate in conjunction with an alternating sequence, independent of the number of electrodes being used or inserted in the apparatus. In this type of arrangement, the electrode first melted off and consumed, becomes replaced with a new electrode which was held in readiness, after the electrode support is swung into position for such replacement of the electrodes.

A particularly advantageous embodiment of the present invention provides for an arrangement of four electrode carrying arms used to simultaneously insert four electrodes to be melted. Four single-phase electrical power supplies are, furthermore, provided. These electrical power supplies are connected to the electrodes in a manner, so that one pole of each phase is connected to one electrode, whereas the other poles of all phases are applied to the chill mold. As a result, the power supplies are shifted in phase alternatingly by 180° and by 90° with respect to the electrodes along the circumference and about the center of the chill mold.

If in operation of the arrangement, the phase shift is maintained during the melting process, a rotary field is not formed on the electrode system, even though a continuous change in polarity of the potential takes place at each electrode. This is contrary to the conventional arrangements involving systems with three electrodes or more than four electrodes, and which are powered or supplied with alternating current. The process should not be mistakenly thought of as one with a periodic reversal of current, for the purpose of obtaining a reversal in direction of the rotary field. In the conventional processes, a bath rotation takes place, and such bath rotation becomes compensated directly through a subsequent reversal in rotary direction. Such rotation of the bath takes place even though this may be for a substantially short time interval.

In contrast to the conventional arrangements, no bath rotation takes place in the present invention. As a result, such bath rotation need not be compensated for or eliminated when using applicant's arrangement. At the same time, the avoidance of a bath rotation is of exceptional importance. The motorized force of a rotary field produces the rotation of the light-weight slags in electrical slag melting furnaces. As a result of the rotation of the slags, the metallic bath becomes also increasingly rotational, so that is is forced to rotate with the slag. Whereas rotation of the slag only, might produce positive effects from the viewpoint of obtaining desirable mixing effects, it is undesirable to have the metal bath also rotating. This is due to the possibility that such rotation of the metal baths can lead readily to segregations in the ingot. In a motorized movement of a melting bath, for example, the impurities wander toward the interior and in direction toward the axis of the chill mold, since they are specifically lighter in weight than the molten metal. The blocks or ingots which are cast from such chill molds must then be discarded in most cases, or must be remelted and recast from a bath not subjected to any such motion. Thus, the distribution of the impurities are generally undesirable in the resulting ingots that are cast from baths subjected to rotary movements. The disadvantages of bath rotations are avoided by the present invention, without requiring the application of additional equipment in the form of circuitry or controlling elements. The condition that the phase angle between the power supplies of two neighboring electrodes is alternatingly 180° and 90° with respect to the center M of the chill mold along the direction of the circumference, is not to be considered a limiting condition. Small deviations from these phase angles do not lead to bath rotations, since the content of the chill mold serve as a braking means, in view of their physical properties. Thus, phase shifts are possible which alternate between 160° to 200° and 80° to 100°.

The novel features which are considered as characteristic for the invention are set forth in particular in the appended claims. The invention itself, however, both as to its construction and its method of operation, will be best understood from the following description of specific embodiments when read in connection with the accompanying drawing.

BRIEF DESCRIPTION OF THE DRAWING

FIG. 3 is a diagrammatic representation of the voltage function and phase shift between four electrodes to be melted off with the arrangement of FIG. 1;

FIG. 4 is a sequential timing diagram of the polarities applied to the individual electrodes.

DESCRIPTION OF THE PREFERRED EMBODIMENTS

Figure 1:
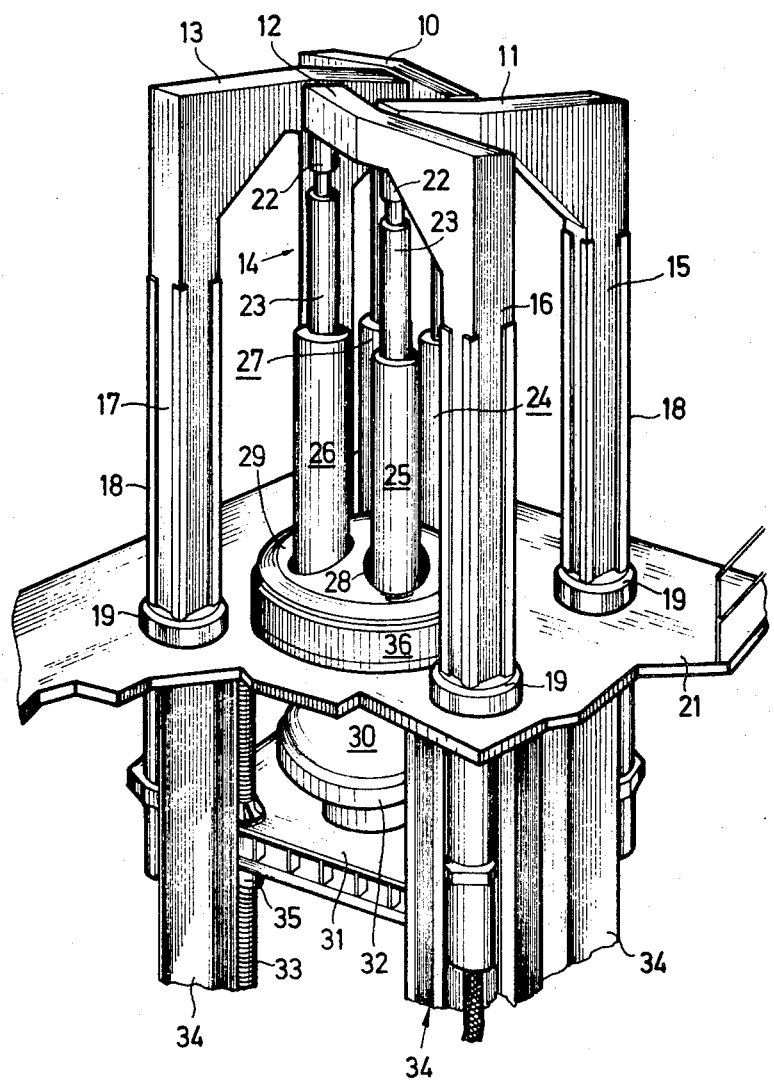
FIG. 1 is a perspective view of an arrangement in accordance with the present invention, when used in conjunction with a furnace.

Referring to the drawing and in particular to FIG. 1, four electrode carrying arms 10, 11, 12 and 13 are integrally constructed with guide posts 14, 15, 16 and 17, respectively. These guide posts or guide columns are provided with tracks 18 which ride in a guide member 19. Beneath the guide member 19 are rotary drives for raising and lowering each one of the guide posts or columns. This rotary drive for raising or lowering the columns are not the essence of the present invention and are, therefore, not further described in detail. The rotary drives and the guide members 19 connected to the drives are secured to a platform 21 which serves as a mounting member and a reference plane.

Electrode holding and mounting arrangements 23 are provided at the free ends of the electrode carrying arms 10 to 13. The electrodes 24, 25, 26 and 27 which are to be melted, are coupled to the holding and mounting arrangements 23. The electrodes to be melted pass through openings 28 of a suction or vacuum cover or hood 29. Through the opening 28, the electrodes reach into the interior of a fluid-cooled chill mold 36 where they are melted to an ingot. The melting of the electrodes and conversion to ingots, results in an "endless" rod 30 which exits from beneath the chill mold. The drawing or removal of the rod 30 is accomplished through a movable platform 31 which is also provided with a fluid-cooled base plate 32 for supporting the rod. The motion of the platform is derived from four threaded rods 33, of which only one is visible in the drawing. The remaining threaded rods are hidden or covered by the supporting columns 34 used to support the entire arrangement or construction. The raising or lowering motion is transmitted from the threaded rods 33 to the platform 31, through a threaded nut 35. Each of the threaded rods 33 is provided with such a nut 35.

Figure 2:
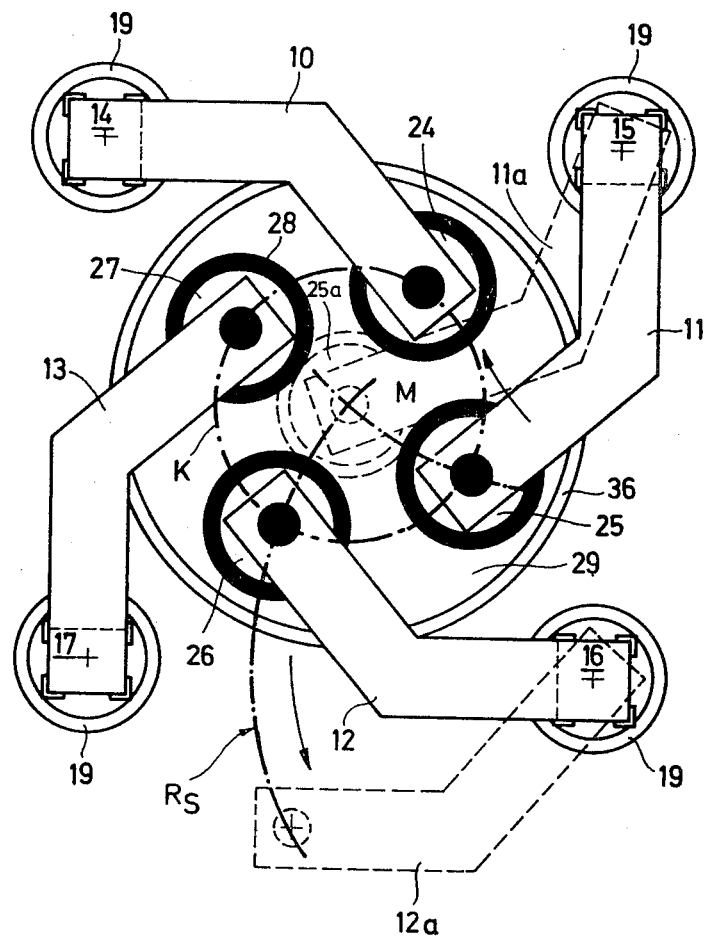
FIG. 2 is a plan view of the furnace of FIG. 1, and shows different possible paths of motion for the electrode carrying arms used in the arrangement of the present invention.

In FIG. 2, the solid lines illustrate the parts of the arrangement when in the position corresponding to that shown in perspective in FIG. 1. The four electrodes to be melted 24, 25, 26 and 27 are also shown here, in FIG. 2, in place. The spacing of the rotational axis of each of the guiding posts or columns 41 to 17, from the axis of the corresponding electrodes 24 to 27, is equal to the radius of the circular path $R_s$. As shown in FIG. 2, the circular paths of all electrode carrying arms 10 to 13 intersect the center point M of the ingot chill mold 36.

The position 12a of the arm 12, illustrates the position of the arm when rotated to a position distant from the center of the chill mold M. The position 11a of the arm 11, on the other hand, shows the position of the electrode carrying arm 11 when being directly positioned above the center of the chill mold. Accordingly, the electrode carrying arms can be rotated from a furthest position from the chill mold, to a position in which the electrodes are directly located at the center point M of the chill mold 36. By selectively rotating the electrode carrying arms, in this manner, the furnace can be operated in conjunction with a single electrode to be melted.

While one carrying arm is located with its respective electrode at the center point M of the chill mold, and the electrode is in the process of being melted, another electrode carrying arm as, for example, the carrying arm 12, may be brought to the position 12a where the arm is provided with a new electrode to be melted. The new or fresh electrode mounted onto the electrode carrying arm 12, in this manner, is then held in position at the location 12a, until the electrode 25a, for example, is fully melted and consumed. Thus, the position 12a serves as a holding and ready position for the next or subsequent melting operation. The interchange of electrodes for sequential melting operations, is known in the art, and detailed description is, for this reason, not required. At the same time, it is also possible to melt two electrodes simultaneously with AC current, for example, and to apply fresh or new electrodes to the other two electrode carrying arms, and to hold these arms in ready position outside of the chill mold radius. When using this arrangement of melting two electrodes simultaneously, the electrodes are paired preferably so that diametrically oppositely-lying electrodes are paired.

FIG. 3 shows the function of the voltage applied to the electrodes to be melted, 24, 25, 26 and 27, in relation to time or phase angle. The generating of alternating rectangular-shaped voltages is well known in the AC rectifying technology, and is not the object of the present invention. It should be noted that the phase shift between the electrodes 24 and 25 is 180°. The phase shift between electrodes 25 and 26 is 90°, and the phase shift between electrodes 26 and 27 is again 180°. The circle closes again between the electrodes 27 and 24, with a 90° phase shift.

The results of such an energy supply is illustrated in FIGS. 4a to 4d, in which the polarity of the electrodes is designated at each instant of time. The arrows in FIG. 4 correlate the diagrams of that figure with the phase sections of FIG. 3. Thus, the polarity applied to the electrodes varies in accordance with the sequence of FIGS. 4a to 4d. It may be seen from the drawing, that no rotary field is formed in the electrode system. FIG. 4b, furthermore, includes the current supply consisting of the power supply elements 37, 38, 39 and 40. Such a supply applies similarly to FIGS. 4a, c and d. Current conductors 41 interconnect the electrodes with the power supply elements such that electrodes 24, 25, 26 and 27 are respectively connected to the power supply elements 37, 38, 39 and 40. One terminal of all of the power supply elements, is connected to a common line 42 leading to the base or bottom of the chill mold 36.

In accordance with the present invention, therefore, one or more electrodes to be melted can be processed in one and the same chill mold. A number of electrode carrying arms can be distributed about the periphery of the chill mold, and may be horizontally movable and pivotable so that the path of motion of the electrodes carried by the arms, intersects the center of the chill mold. The electrode carrying arms, furthermore, can be rotated or pivoted so that the electrodes all lie upon a circular path K shown in FIG. 2, which is concentric with respect to the rim or outer circumference of the chill mold 36. This circular path K on which the individual electrodes are centered and positioned, lies within the crucible.

It will be understood that each of the elements described above, or two or more together, may also find a useful application in other types of electrode remelting arrangements from the types described above.

While the invention has been illustrated and described as embodied in electrode remelting arrangements, it is not intended to be limited to the details shown, since various modifications and structural changes may be made without departing in any way from the spirit of the present invention.

What is claimed is:

1. An arrangement for melting electrodes comprising in combination, a chill mold, a plurality of at least three electrode carrying means distributed about the periphery of said chill mold for carrying at least one electrode to be melted; pivoting means connected to said electrode carrying means for pivoting said electrode carrying means in a horizontal plane, the radius from the pivoting center of said pivoting means to the axis of said electrode passing through the center of said chill mold, said electrode carrying means being further pivotable by said pivoting means so that the axes of electrodes carried by said carrying means can be held on concentric circles within said chill mold.

2. An arrangement for melting electrodes comprising, in combination a chill mold, a plurality of electrode carrying means distributed about the periphery of said chill mold for carrying at least one electrode to be melted; pivoting means connected to said electrode carrying means for pivoting said electrode carrying means in a horizontal plane, the radius from the pivoting center of said pivoting means to the axis of said electrode passing through the center of said chill mold, said electrode carrying means being further pivotable by said pivoting means so that the axes of electrodes carried by said carrying means lie on concentric circles within said chill mold, said plurality of electrodes carrying means comprising four electrode carrying arms for inserting simultaneously four electrodes to be melted.

3. The arrangement as defined in claim 1 including four single-phase electrical power supply means connected to said electrodes to be melted.

4. The arrangement as defined in claim 3 wherein one pole of each phase of each power supply is connected to one electrode, the other pole of each phase of each power supply being applied to said chill mold.

5. The arrangement as defined in claim 4 wherein said power supplies are alternatingly shifted in phase by substantially 180° and 90° along the periphery of said chill mold with respect to said electrodes about the center of said chill mold.

6. The arrangement as defined in claim 5 wherein the phase shift between neighboring electrodes alternates substantially by 180° and 90°.

* * * * *